Oct. 26, 1954

F. C. KUCH 2,692,499

FLAW TESTER FOR TAPE

Filed Sept. 29, 1950

2 Sheets-Sheet 1

INVENTOR
F. C. KUCH
BY J W Schmied
ATTORNEY

Oct. 26, 1954 F. C. KUCH 2,692,499

FLAW TESTER FOR TAPE

Filed Sept. 29, 1950 2 Sheets-Sheet 2

INVENTOR
F. C. KUCH
BY
J. W. Schmied
ATTORNEY

Patented Oct. 26, 1954 2,692,499

UNITED STATES PATENT OFFICE 2,692,499

FLAW TESTER FOR TAPE

Frederick C. Kuch, New Providence, N. J., assignor to Bell Telephone Laboratories, Incorporated, New York, N. Y., a corporation of New York Application September 29, 1950, Serial No. 187,510

9 Claims. (Cl. 73—159)

This invention relates to apparatus for testing the mechanical resistance of tape to ascertain the presence of mechanically weak spots or holes which render the tape defective.

In the prior art information is recorded on tape, usually paper, in many different ways. The tape may, however, be of plastic, metal foil or other material. In some arrangements the information is printed on the tape directly without encoding. In other arrangements certain portions of the tape are rendered conductive to electrical currents in accordance with encoded information code groups. In the type of system to which this invention is usually applicable, information is encoded into different code combinations of holes and non-holes which are introduced in the tape by a perforating device. In decoding, this perforated tape passes under a set of reader fingers which actuate electrical contacts in accordance with the passages or obstruction offered by the holes and non-holes to particular reader fingers. The reader fingers exert a force against the tape surface tending to puncture the surface where no perforations exist but are unable to do so because of the resistance thereto presented by the tape. If a legitimate perforation is present under a reader finger, the finger will project therethrough operating the associated electrical contact. If a reader finger passes over a portion of the tape which was to offer opposition to the finger for a particular code combination, and because of a tape defect or unwanted hole the tape allows the finger to pass therethrough thereby operating the electrical contact associated therewith falsely, an improper or erroneous code combination is transmitted by the information system.

Accordingly, it is an object of this invention to test tape used in information apparatus for the presence of unwanted holes and mechanically weak spots therein which render the tape defective.

Another object of this invention is the improvement of the accuracy of information systems by tesing the tape used therein for imperfections which tend to mutilate one or more code groups represented by perforated code combinations.

The tape testing apparatus of this invention comprises two circumferentially grooved cylinders with a number of spring forced testing pins projecting through radially aligned holes in the portion of the cylinder wall between adjacent grooves. The cylinders are mated with respect to one another so that the pins of one cylinder when fully projecting fall in the grooves of the opposite cylinder. In operation the tape to be tested is passed between the cylinders so that the surface thereof is subjected to the pressure exerted by the individual spring forced testing pins. As both cylinders are rotated the tape is fed past the portion of cylinders closest thereto by the gear action of the testing pins against the tape surface. If a portion of the tape being tested is defective and weak mechanically, one or more of the spring forced testing pins will pass through the tape and project into the mating groove of the opposite cylinder thereby moving an electrical switch electrode located in the groove so as to complete an electrical circuit which operates an alarm or recording device which indicates that a defective spot or spots in the tape has been located. When defects are found, corrective measures are subsequently taken to remove the defective section by cutting and splicing the tape.

In the arrangement hereinbefore described the testing pins are staggered and are so spaced that although they do not test the entire area of the tape they do cover an area in the vicinity where reader fingers could hit the tape. However, two or more sets of grooved cylinders with spring forced testing pins may be arranged so that each set tests the tape at different spots and in this manner the entire area of the tape may be scanned.

For a particular testing apparatus the pressure exerted by a single testing pin against the tape should preferably be equal to the pressure exerted by a single reader finger; furthermore, the testing pin should preferably have the same area and shape as the end of the reader finger of the information system which is to subsequently utilize the tape.

With these and incidental objects in view, the invention comprises certain novel features of construction the essential elements of which are set forth in the appended claims and a preferred form or embodiment of which is hereinafter described with reference to the drawings in which:

Figure 1:
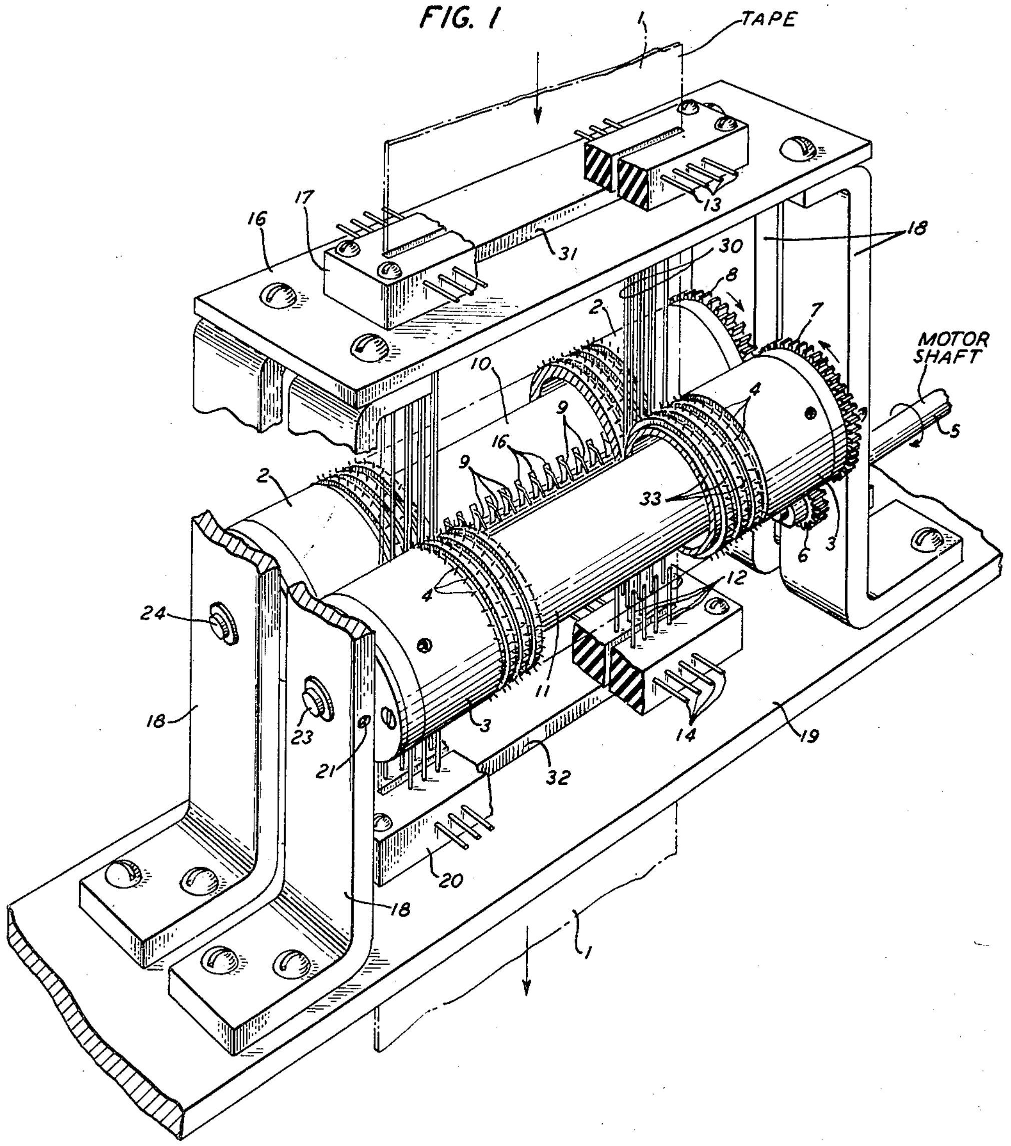
Fig. 1 is a perspective view of the testing apparatus of this invention with portions thereof broken away.

The general structural arrangement of the apparatus of this invention is shown in perspective in Fig. 1. A portion of supporting brackets 18, insulating blocks 17 and 20, and cylinders 2 and 3 are broken away to facilitate representation and understanding of the invention. In general, the apparatus comprises two main subcombinations, a mechanical subcombination to test the tape and an electrical subcombination to operate an alarm or recording device which indicates that a defective portion of tape has been found. The mechanical subcombination is used to test the mechanical resistance of tape 1 to piercing or puncturing of the same or greater pressure the tape will be subjected to when it is utilized in an information system employing reader fingers or pins which search for holes intentionally placed in the tape so as to read the information contained in various hole and non-hole code combinations of the tape. In the actual reading operation the reader fingers exert a force against the tape surface tending to puncture the tape but are unable to do so because of the resistance presented thereto by the tape. If a defect exists in the tape because of a "slime" or "pitch" spot or the like, the tape will puncture at these spots because of the force applied by the reader fingers thereby erroneously actuating the information system inasmuch as a reader finger projecting through the tape operates a contact which transmits or registers a code value which was not intended. Likewise, unwanted holes in the tape will cause erroneous operation of the information system.

Figure 2:
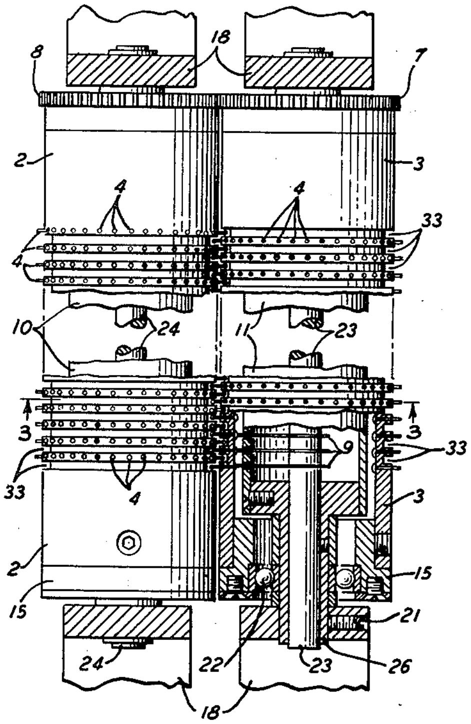
Fig. 2 is a plan view of the apparatus of Fig. 1 partly in section and with the top support piece removed.
Figure 3:
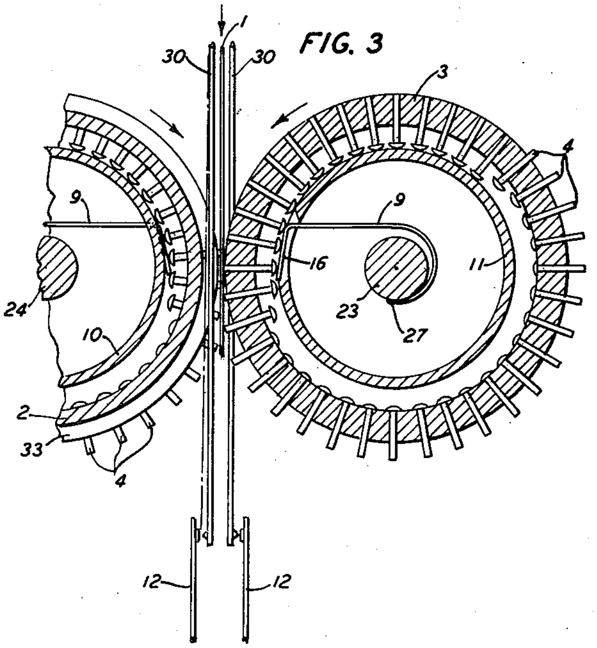
Fig. 3 is a sectional view taken along section line 3—3 of Fig. 2 showing the operation of the testing pins when the tape being tested is not defective.

The mechanical resistance of the tape which is to be utilized in such a system is tested before actual use by this invention which comprises two cylinders 2 and 3 each of which has a plurality of circumferential grooves 33 on the outer surface thereof. These grooves are rectangular or U-shaped in cross-section as is best shown in Fig. 2. The raised portion of cylinders 2 and 3 between adjacent grooves 33 has a plurality of holes drilled radially therethrough which house testing pins 4 as is best shown in Fig. 3. Testing pins 4 should preferably have the same striking end shape as that of the reader fingers of the information system which is to ultimately utilize the tape.

Figure 4:
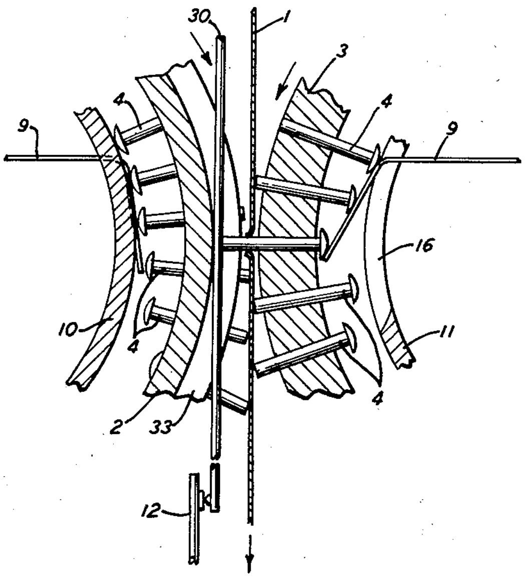
Fig. 4 is a sectional view showing the operation of the testing pins when a defective portion of tape is being tested.

Cylinders 2 and 3 are mated with respect to one another so that the testing pins 4 of any cylinder when fully projecting from the holes thereof fall in the grooves of the opposite cylinder as is best shown in Fig. 2. Cylinders 2 and 3 have a wall thickness, as is best shown in Fig. 4, which allow pins 4 to project almost the entire depth of the mating grooves 33 when the pins are not obstructed by the tape 1.

Within cylinders 2 and 3 are located cylinders 10 and 11 which remain in a fixed or stationary position, whereas, cylinders 2 and 3 rotate toward one another during operation of the apparatus in response to a rotary force applied to shaft 5 in the direction of the arrow, said force being coupled to cylinders 2 and 3 by gear 6 which meshes with gears 7 and 8.

Tape 1 is passed between cylinders 2 and 3 by feeding the tape into slot 31 located in upper support piece 16 and out of slot 32 located in lower base piece 19. As cylinders 2 and 3 are rotated toward one another in a direction indicated by the arrows, the heads of the testing pins 4 of both cylinders 2 and 3 pass over springs 9, as is best shown in Fig. 3, in such a manner that the springs force the pins in an outward direction thereby contacting tape 1. The gear action of the testing pins upon the surface of tape 1 feeds the tape continually in a downward direction through the apparatus. There is one spring 9 for each circumferential ring of testing pins. Each spring remains in a stationary position inasmuch as the springs are passed through slits 16 in stationary cylinders 10 and 11 and are spot welded or otherwise securely attached to stationary shafts 23 or 24 in a manner shown by reference numeral 27 of Fig. 3. Stationary cylinders 10 and 11 also serve to prevent the testing pins 4 from falling out of their holes in the rotating cylinders 2 and 3 as is best shown in Fig. 3.

The structural arrangement which permits the rotation of cylinders 2 and 3 while springs 9, cylinders 10 and 11 and shafts 23 and 24 remain stationary is shown in Fig. 2, which is a top view of the apparatus with the structures 16 and 17 removed. Cylinder 3 is shown partly in section; however, it is to be understood that the internal structural arrangement within cylinder 2 is exactly the same as that within cylinder 3. In particular, cylinder piece 15 and cylinder 3 are screwed securely to one another and the combination thereof is supported by ball bearings 22 so that the application of a rotary force to gears 7 and 8 which are secured to cylinders 2 and 3, respectively, moves said cylinders therewith.

End piece 26 is screwed securely to inner cylinder 11 and shaft 23 and the entire combination thereof is secured to stationary bracket 18 by set screw 21.

Springs 9 should preferably be tensioned so that they cause each testing pin 4 to apply a force to the surface of tape 1 equal to that applied by an individual reader finger to the tape of the information system which is to subsequently utilize the tested tape.

As the rotating cylinders 2 and 3 carry their associated testing pins 4 over the stationary springs 9, a force is applied to the heads of the pins forcing the pins in an outward direction thereby piercing or puncturing paper tape 1 unless the resistance of the tape is sufficient to prevent same. This action is shown in Fig. 3. If, however, any particular pin 4 strikes a defective portion of tape 1, the pin will pierce the tape and fall into the mating groove 33 of the opposite cylinder as is shown in Fig. 4.

As the cylinders 2 and 3 rotate and the tape 1 progresses past the rows of forced testing pins 4, the pins become free of their springs thereby relieving the pressure therefrom. The pins are then withdrawn from the defective spots of the tape. In any case, whether or not defects are found, the pins 4 become free of the influence of the springs 9.

In order to facilitate supervision of the testing operation a switch electrode 30 is located in the bottom of each groove 33 in a manner which is best shown in Figs. 3 and 4. If the tape is not punctured, as is shown in Fig. 3, the electrode 30 remains undisturbed and the electrical contact between electrode 30 and a coperating electrode 12 remains open. If, however, the tape is punctured, as is shown in Fig. 4, electrode 30 is actuated by a force applied thereto by the projecting testing pin 4, thereby closing the contact gap between electrodes 30 and 12. Any alarm or recording arrangement known in the prior art which can be operated by the closing of an electrical contact can be connected to terminals 13 and 14 which are supported by insulating blocks 17 and 20. Each of terminals 13 is connected to a different one of electrodes 30 within block 17 and each of terminals 14 is connected to a different one of electrodes 12 within block 20. All of terminals 13 can be connected into multiple and all of terminals 14 can be connected into multiple if the alarm supervision is to be confined to an entire row portion of the tape. If the alarm arrangement is to identify specific portions of each row then the alarm circuits connected to terminals 13 and 14 must be kept separate.

Figure 5:
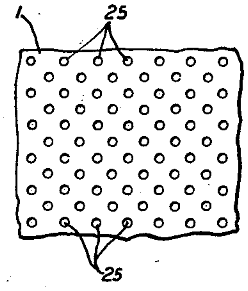
Fig. 5 is a fragmentary portion of tape with the small round areas thereof representing the tape surface actually tested with one set of cylinders.

Fig. 5 shows a fragmentary portion of tested tape with areas 25 being the portion of the tape subjected to the testing force of pins 4. If it is desirable to test the entire paper surface, a second, and additional, if necessary, testing apparatus can be ganged to a first testing apparatus so that the testing pins thereof can test different portions of the tape thereby covering the entire tape surface.

It is to be understood that the above described arrangements are illustrative of the application of the principles of the invention. Numerous other arrangements may be devised by those skilled in the art without departing from the scope of the invention.

What is claimed is:

1. A tape tester for testing the mechanical strength of tape comprising a cylinder and a solid backing member between which said tape passes, means for rotating said cylinder toward said backing member, said cylinder having a plurality of circumferential rings of testing pins slidably projecting through the cylinder walls thereof, said backing member having openings opposite said pins and aligned with the ends thereof, a plurality of springs, one for each circumferential ring of testing pins, for applying a force of specified value in such a direction as to force one or more of the pins of the associated pin rings outwardly upon the surface of said tape thereby testing the mechanical resistance of said tape to puncturing, the gear action of said pins upon said surface of said tape constituting the sole feeding means for continuously feeding said tape between said cylinder and said backing member.

2. A tape testing apparatus for testing the mechanical strength of tape comprising a cylinder and a solid backing member between which said tape passes, means for rotating said cylinder toward said backing member, said cylinder having a plurality of circumferential rings of testing pins slidably projecting through the cylinder walls thereof, said backing member having openings opposite said pins and aligned with the ends thereof, a plurality of springs, one for each circumferential ring of testing pins, for exerting a specified value outward force upon the pins of the associated pin rings thereby forcing said pins against the surface of said tape and puncturing some of said tape if defective, the gear action of said pins upon said surface of said tape constituting the sole feeding means for continuously feeding said tape between said cylinder and said backing member, and means actuated by passage of a pin through a puncture for operating a device for indicating that a defective tape portion has been found.

3. A tape testing apparatus comprising two cylinders between which said tape is to be passed, said cylinders each being provided with a plurality of spaced circumferential grooves, and each of said cylinders having a plurality of testing pins arranged between the grooves and slidably projecting from the cylinder walls, means for exerting an outward force on said testing pins, said cylinders being mated so that the testing pins of one cylinder fall into the grooves of the opposite cylinder if said tape is punctured by one or more of said testing pins when the testing pins pass over a defective portion of tape, and means for rotating the cylinders toward one another so that the gear action of said pins upon said tape surface continuously feeds said tape past the cylinders.

4. A tape testing apparatus comprising two cylinders each located on opposite sides of and closely adjacent to tape passing therebetween, said cylinders each being provided with a plurality of spaced circumferential grooves, each of said cylinders having a plurality of testing pins arranged between the grooves and slidably projecting from the cylinder walls, said testing pins of each cylinder being situated opposite the grooves of the other cylinder, a plurality of springs for exerting a force of specified value upon said testing pins thereby causing said pins to contact said tape surface and puncturing defective portions of said tape, and means for rotating the cylinders toward one another so that the gear action of said pins upon said tape surface continuously feeds said tape past the cylinders.

5. A tape testing apparatus comprising two cylinders each located on opposite sides of and closely adjacent to tape passing therebetween, said cylinders each being provided with a plurality of spaced circumferential grooves, each of said cylinders having a plurality of testing pins arranged between the grooves and slidably projecting from the cylinder walls, said testing pins of each cylinder being situated opposite the grooves of the other cylinder, a plurality of springs for exerting a force of specified value upon said testing pins thereby causing said pins to contact said tape surface and puncturing defective portions of said tape, means for rotating the cylinders toward one another so that the gear action of said pins upon said tape surface continuously feeds said tape past the cylinders, and means actuated by passage of a pin through a puncture for operating a device for indicating that a defective tape portion has been found.

6. A tape tester comprising a first outer cylinder, a second outer cylinder arranged parallel and adjacent to said first cylinder so as to produce a roller action when both of said cylinders are rotated in opposite directions, said outer cylinders each being provided with a plurality of spaced circumferential grooves, and each said outer cylinder including a stationary inner cylinder concentrically located therein and a stationary shaft concentrically arranged within said inner cylinder, a plurality of springs secured to said shaft and extending out of a plurality of slits in the cylinder wall of said inner cylinder, an arrangement of testing pins slidably projecting through the cylinder wall of each outer cylinder between the grooves and directed radially with respect to the shaft therein, said testing pin arrangement comprising a plurality of rows parallel to the hollow axis of each said outer cylinder and rings extending circumferentially around each said outer cylinder, the rings of pins of said first outer cylinder being arranged so as to mate with the grooves of said second outer cylinder, and said plurality of springs passing through the slits of the inner cylinders in such a manner that the pins of each outer cylinder will be forced out of the holes of said outer cylinders toward the other outer cylinder thereby exerting a plurality of pressure test points on a tape which is being passed between the two outer cylinders which act as rollers.

7. A tape tester comprising two cylinders each located on opposite sides of the tape being tested, said cylinders each being provided with a plurality of spaced circumferential grooves and each of said cylinders housing a plurality of testing pins slidably projecting through the cylinder walls thereof, said pins being arranged in circumferential rings and axial rows between the grooves so that the pins on one cylinder mate with the grooves on the other cylinder, a plurality of springs for exerting a specified outwardly directed force upon said pins one row at a time thereby forcing the pins upon the tape being tested so as to puncture said tape at one or more spots if said pins strike a defective portion thereof, and means for rotating both of said cylinders so that the gear action of the spring forced pins upon the tape surface continually feeds the tape between the cylinders.

8. A tape tester comprising two cylinders each located on opposite sides of the tape being tested, said cylinders each being provided with a plurality of spaced circumferential grooves and each of said cylinders housing a plurality of testing pins slidably projecting through the cylinder walls thereof, said pins being arranged in circumferential rings and axial rows between the grooves so that the pins on one cylinder mate with the grooves on the other cylinder, a plurality of springs each communicating with different circumferential pin rings for exerting a specified outwardly directed force upon each of said pins one axial row at a time, thereby forcing the pins upon the tape being tested so as to puncture said tape at one or more spots if said individual pins strike defective portions thereof, and means for rotating both of said cylinders so that the gear action of the spring forced pins upon the tape surface continually feeds the tape between the cylinders.

9. A tape tester comprising a plurality of testing pins, means for housing said pins, said pins being located adjacent to and on both sides of the tape being tested and slidably projecting from said housing means, a plurality of openings in each housing aligned with the pins of the opposite housing, means for passing a tape between said housings, and means for applying a force of specified value to one or more of said testing pins thereby causing said pins to project outwardly from said housing upon the tape surface being tested and pass through said tape if one or more of said pins locate defective tape portions and means actuated by passage of a pin through a puncture for indicating that a defective tape portion has been located.

References Cited in the file of this patent

UNITED STATES PATENTS

| Number | Name | Date |
|---|---|---|
| 1,277,039 | Braitmayer | Aug. 27, 1918 |
| 1,745,388 | Tauschek | Feb. 4, 1930 |
| 2,089,308 | Sullivan | Aug. 10, 1937 |
| 2,254,197 | Andre | Sept. 2, 1941 |